(12) United States Patent
Rodriguez et al.

(10) Patent No.: US 10,410,309 B2
(45) Date of Patent: *Sep. 10, 2019

(54) CLASSIFICATION AND AUTHENTICATION OF IDENTIFICATION DOCUMENTS USING A CONVOLUTIONAL NEURAL NETWORK

(71) Applicant: FACEBOOK, INC., Menlo Park, CA (US)

(72) Inventors: Raphael A. Rodriguez, Marco Island, FL (US); Michael Muesch, Somerville, MA (US); David Thor, Boston, MA (US); Justin Boyd, Medford, MA (US); Ryan Cahill, Charlestown, MA (US); Xiaolu Xiong, Arlington, MA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/286,470

(22) Filed: Feb. 26, 2019

(65) Prior Publication Data

US 2019/0197642 A1 Jun. 27, 2019

Related U.S. Application Data

(63) Continuation of application No. 15/786,204, filed on Oct. 17, 2017, now Pat. No. 10,217,179.

(Continued)

(51) Int. Cl.
*G06Q 50/26* (2012.01)
*G06K 9/32* (2006.01)
(Continued)

(52) U.S. Cl.
CPC ......... *G06Q 50/265* (2013.01); *G06K 7/1417* (2013.01); *G06K 9/00442* (2013.01);
(Continued)

(58) Field of Classification Search
CPC ............ G06Q 50/265; G06K 9/00442; G06K 9/4628; G06K 9/3275; G06K 7/1417;
(Continued)

(56) References Cited

FOREIGN PATENT DOCUMENTS

WO WO/2015/196084 A1 12/2015
WO WO-2015196084 A1 * 12/2015 ............... G07D 7/20

OTHER PUBLICATIONS

Rodriguez, Notice of Allowance, U.S. Appl. No. 15/786,204, dated Oct. 9, 2018, 8 pgs.

* cited by examiner

*Primary Examiner* — Amandeep Saini
(74) *Attorney, Agent, or Firm* — Morgan, Lewis & Bockius LLP

(57) ABSTRACT

The present disclosure describes a method to determine whether a physical identification document is authentic. An authentication manager receives an image of a physical identification document to be authenticated. The authentication manager extracts a set of characteristics of the document from the image. The authentication manager determines a class of the document based on the set of characteristics. The authentication manager applies a convolution kernel, convolving the image with the kernel to generate a feature map. The authentication manager determines a score based on the feature map, where the score identifies the likelihood that the document is valid. The authentication manager then provides an indication that the physical document is authentic based on the score.

20 Claims, 12 Drawing Sheets

Related U.S. Application Data

(60) Provisional application No. 62/409,148, filed on Oct. 17, 2016.

(51) Int. Cl.
  *G06K 7/14*      (2006.01)
  *G06K 19/06*     (2006.01)
  *G06K 9/00*      (2006.01)
  *G06N 3/02*      (2006.01)
  *G06K 9/46*      (2006.01)

(52) U.S. Cl.
  CPC .............. *G06K 9/3275* (2013.01); *G06K 9/46* (2013.01); *G06K 9/4628* (2013.01); *G06K 19/06028* (2013.01); *G06K 19/06037* (2013.01); *G06N 3/02* (2013.01); *G06K 2009/0059* (2013.01)

(58) Field of Classification Search
  CPC ............... G06K 19/06028; G06K 9/46; G06K 19/06037; G06K 2009/0059; G06N 3/02
  USPC ........................................................ 382/112
  See application file for complete search history.

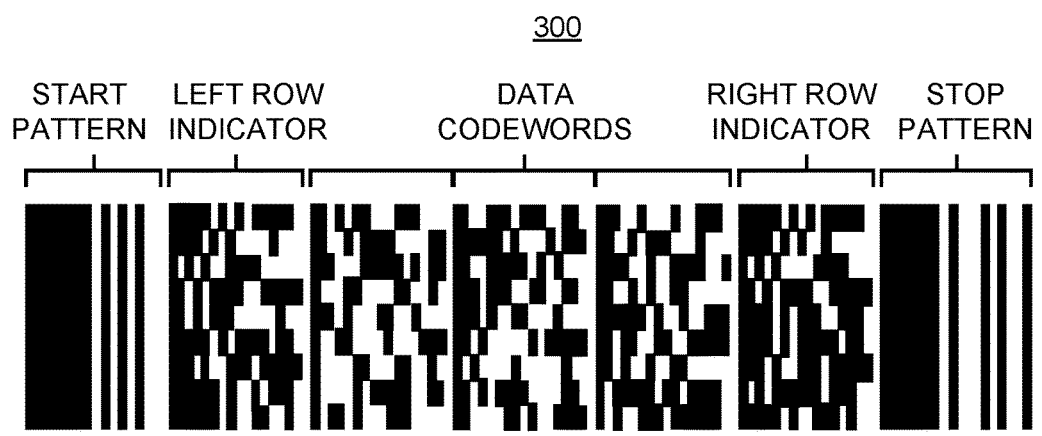
*FIG. 3*
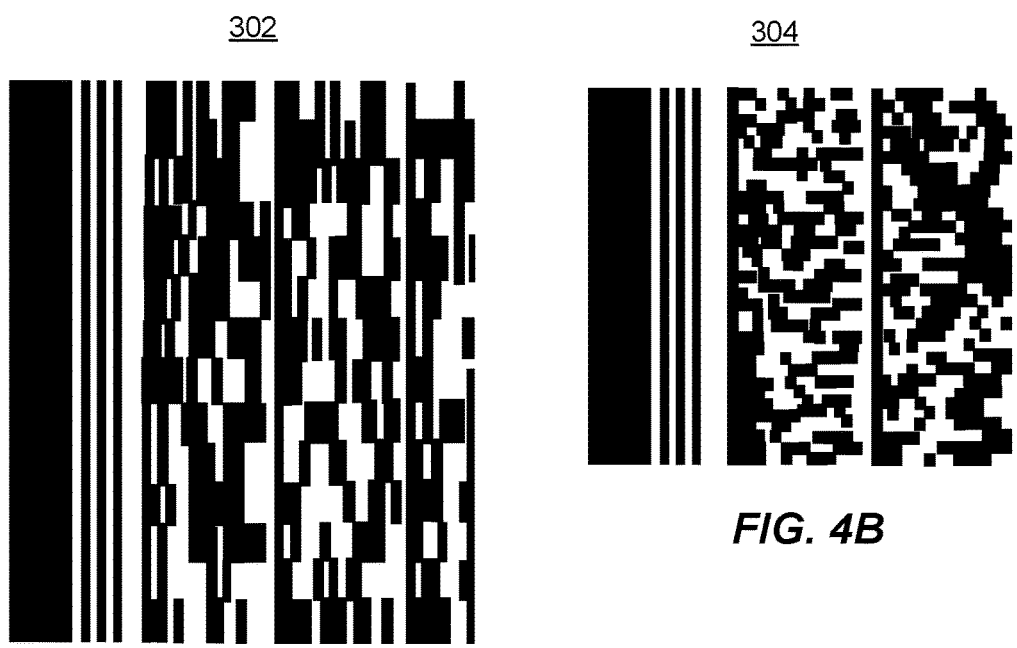
*FIG. 4A*
*FIG. 4B*

CLASSIFICATION AND AUTHENTICATION OF IDENTIFICATION DOCUMENTS USING A CONVOLUTIONAL NEURAL NETWORK

RELATED APPLICATIONS

This application is a continuation of U.S. patent application Ser. No. 15/786,204, filed Oct. 17, 2017, which claims priority to U.S. Provisional Patent Application No. 62/409,148, filed Oct. 17, 2016, each of which is incorporated by reference herein in its entirety.

BACKGROUND

The use of fake IDs is an issue in many business sectors such as underage drinking prevention, visitor management, ID retail fraud, employment authorization, etc. The fake IDs utilized today are obtainable over the internet for low cost and are remarkably close in appearance to the genuine article—even to the point that law enforcement personnel have difficulty distinguishing the real from the fake.

BRIEF SUMMARY

The present solution disclosed herein is directed to methods and systems for authenticating identification (ID) documents. In some implementations, the method can include automatically classifying, authenticating, and extracting data from documents of known formats using machine learning, specifically a convolutional neural network (CNN, or ConvNet). The identification documents can include a driver's license, passport, and other forms of identification. In some implementations, the systems and methods described herein can be used to authenticate fixed format documents (e.g. currency, stamps, securities, certificates, permits, invoices, and forms). The artificial intelligence based machine learning classification methods described herein are applicable to pattern recognition tasks where some assignment of objects to classes is performed.

Fake ID documents can be an issue and have become difficult to detect by the naked eye. Fake ID document producers can reproduce the data content of 2D barcodes. However, fake ID document producers can have a difficult time reproducing the physical and/or visual characteristics of real IDs. For example, the fake ID producers may not be able to reproduce the physical characteristics of barcodes, such as 2D barcodes in PDF-417 format. The present solution utilizes the specific production characteristics of various features on a given ID document to verify its authenticity. The present solution captures images of candidate IDs and then measures various physical and/or visual characteristics of the candidate ID documents. The solution automatically compares the physical characteristics from the candidate ID documents to physical and/or visual characteristics captured from real IDs and provides the user with a determination of whether the candidate ID document is real or fake.

Until recently, the examination and assessment of ID documents was usually carried out by human interaction with the physical person and ID present. With training, many examiners are very good at determining the authenticity of an ID document or detecting alterations to it. However, the problem has become significantly more difficult as the number of government issued ID documents alone has grown to more than 3,000 active types in circulation and many more that have simply passed an expiration date. Additionally, the ability of the forgers has also increased—making it more difficult to identify fraudulent ID documents by eye.

The present solution provides a system that can authenticate these growing number of documents. In some implementations, the present solution can correct for environmental challenges that can arise when capturing images with mobile phones and web-cameras. The environmental challenges can be broken down into two groups: physical and electronic. Physical challenges can include damaged to the document, dirt, and related wear and tear on the document. The electronic challenges can include challenges caused during the actual image capture of the document. Some of these include Glare, Shadow Hue, Offset Edges, Blur, Rotation, and Overexposure of the documents. Without overcoming these challenges, an online cloud based ID systems may not be able to verify or validate the true authenticity of the document being presented as it causes the overall system to fail due to the document being presented electronically as an "unknown" document type. The system of the present solution can normalize the submitted images to overcome these challenges.

The system of the present solution also includes a subset of artificial intelligence, which can address specific application areas such as playing strategic games, language translation, self-driving vehicles, and in this case image recognition using machine learning called Convolutional Neural Network (CNN) to enable a new paradigm to remove the current human limitations, fix and remediate the previously disclosed normalization and environmental issues, and to provide a more thorough and reliable classification and authentication method. Additionally, utilizing neural nets and computer vision can make it faster and simpler to add new document types into the overall system as new government issued documents come into circulation.

According to an aspect of the disclosure, a method to determine that a physical identification document is authentic can include receiving, by an authentication manager, an image of a physical identification document to be authenticated. The method can include extracting, by the authentication manager, a set of characteristics of the physical identification document from the image. The method can include determining, by the authentication manager, a class of the physical identification document based on the set of characteristics of the physical identification document. The method can include selecting, by the authentication manager and based on the class of the physical identification document, a kernel (e.g., convolution kernel, hereinafter referred to as "kernel" or "convolution kernel") to generate pixels of feature maps by processing input pixels from images of physical identification documents. The method can include generating, by the authentication manager, a feature map of the image using the kernel. The method can include determining, by the authentication manager, a score based on the feature map. The method can include providing, by the authentication manager, an indication that the physical identification document is authentic based on the score.

In some implementations, the method can include dividing, by the authentication manager, the image of the physical identification document into a plurality of channels. The method can include selecting, by the authentication manager, a kernel for each of the plurality of channels. The method can include generating, by the authentication manager, a respective feature map for each of the plurality of channels based on the respective kernel for each of the plurality of channels. The method can include determining, by the authentication manager, the score based on the respective feature map for each of the plurality of channels. In some implementations, the method can include generating, by the authentication manager, a respective feature map for each of the plurality of channels using a single kernel.

In some implementations, the method can include training a convolutional neural network with a first plurality of scores from previously authenticated physical identification documents and a second plurality of scores from previously invalidated physical identification documents. The method can include determining the indication that the physical identification is authentic using the convolutional neural network.

In some implementations, the method can include normalizing, by the authentication manager, the image of the physical identification document. Normalizing the image of the physical identification document can include at least one of removing a background from the image, rotating the image, deskewing the image, removing a glare from the image, correcting an exposure of the image, or correcting a blur of the image.

In some implementations, the method can include determining a class of a first face of the physical identification document and a class of a second face of the physical identification document. The method can include determining the score based on a comparison of the class of the first face of the physical identification document to the class of the second face of the physical identification document.

The method can include determining, by the authentication manager, a subclass of the physical identification document based on the set of characteristics of the physical identification document. The method can include selecting the kernel based on the subclass of the physical identification document. The set of characteristics of the physical identification document can include a physical size of a barcode, a location of a barcode, or a location of a security feature.

According to an aspect of the disclosure, a system determine that a physical identification document is authentic can include an authentication manger that is executed by one or more processors. The authentication manager can receive an image of a physical identification document to be authenticated. The authentication manager can extract a set of characteristics of the physical identification document from the image. The authentication can determine a class of the physical identification document based on the set of characteristics of the physical identification document. The authentication manager can select, based on the class of the physical identification document, a kernel to generate pixels of feature maps by processing input pixels from images of physical identification documents. The authentication manager can generate a feature map of the image using the kernel. The authentication manager can determine a score based on the feature map. The authentication manager can provide an indication that the physical identification document is authentic based on the score.

In some implementations, the authentication manager is executable by the one or more processors to divide the image of the physical identification document into a plurality of channels. The authentication manager can be executable by the one or more processors to select a kernel for each of the plurality of channels and generate a respective feature map for each of the plurality of channels based on the respective kernel for each of the plurality of channels. The authentication manager can determine the score based on the respective feature map for each of the plurality of channels.

In some implementations, the authentication manager can be executable by the one or more processors to generating a respective feature map for each of the plurality of channels using the kernel. The authentication manager can be executable by the one or more processors to train a convolutional neural network with a first plurality of scores from previously authenticated physical identification documents and a second plurality of scores from previously invalidated physical identification documents. The authentication manager can determine the indication that the physical identification is authentic using the convolutional neural network.

In some implementations, the authentication manager can normalize the image of the physical identification document. Normalizing the image of the physical identification document can include at least one of removing a background from the image, rotating the image, deskewing the image, removing a glare from the image, correcting an exposure of the image, or correcting a blur of the image.

In some implementations, the authentication manager can determine a class of a first face of the physical identification document and a class of a second face of the physical identification document. The authentication manager can determine the score based on a comparison of the class of the first face of the physical identification document to the class of the second face of the physical identification document.

The authentication manager can be executable by the one or more processors to determine a subclass of the physical identification document based on the set of characteristics of the physical identification document and select the kernel based on the subclass of the physical identification document. The set of characteristics of the physical identification document comprises a physical size of a barcode, a location of a barcode, or a location of a security feature.

BRIEF DESCRIPTION OF THE FIGURES

The foregoing and other objects, aspects, features, and advantages of the disclosure will become more apparent and better understood by referring to the following description taken in conjunction with the accompanying drawings, in which:

FIG. 3 illustrates an example PDF-417 2D barcode in accordance with an implementation of the present disclosure;

FIGS. 4A and 4B illustrate the different height to width ratios used by different states when generating a barcode in accordance with an implementation of the present disclosure;

Figure 1A:
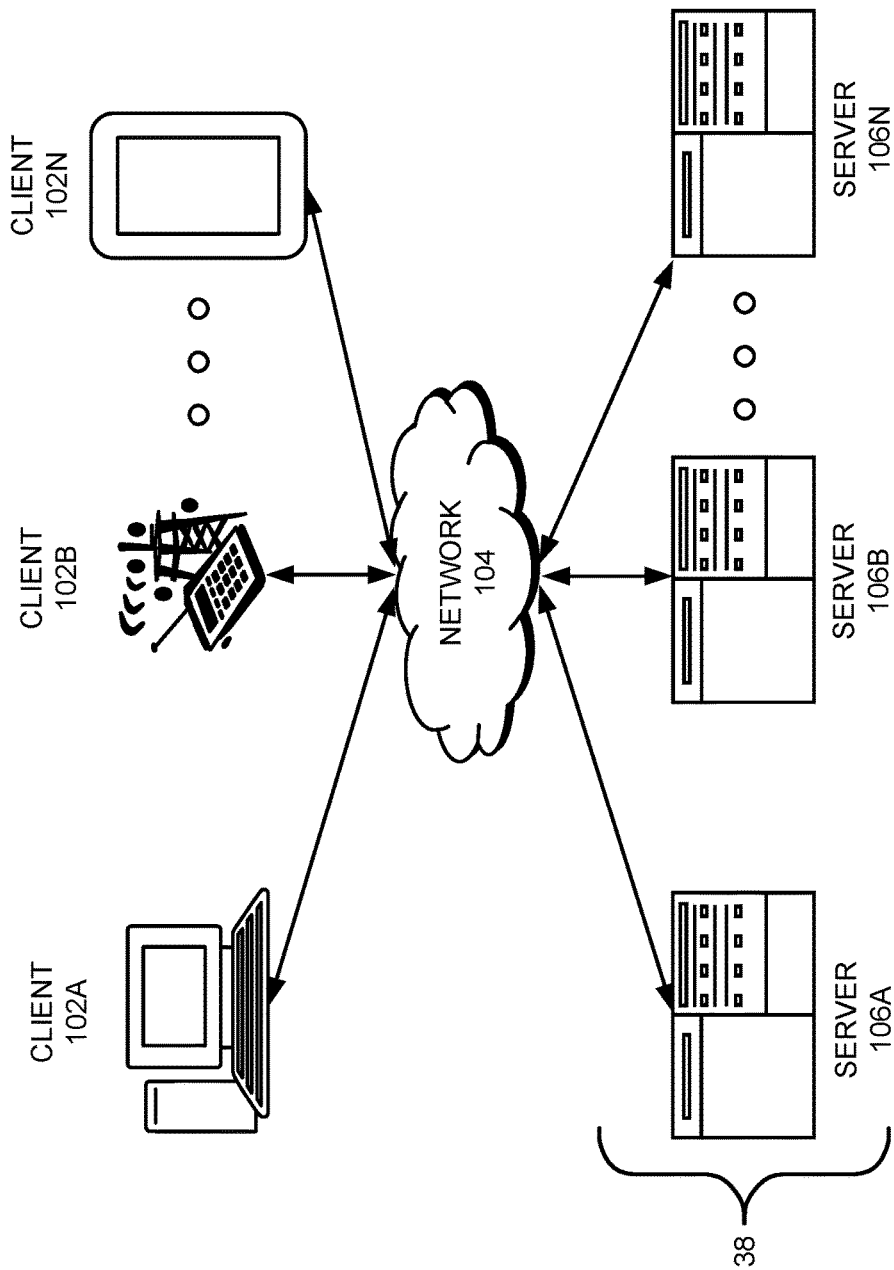
FIG. 1A is a block diagram depicting an embodiment of a network environment comprising local machines in communication with remote machines.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following enumeration of the sections of the specification and their respective contents may be helpful:
- Section A describes a network and computing environment which may be useful for practicing embodiments described herein; and
- Section B describes embodiments of a system and method for the authentication of physical features on identification documents.
- Section C describes embodiments of a system and method for the authentication of identification documents with Convolution Neural Networks.

A. Network and Computing Environment

Prior to discussing the specifics of embodiments of the systems and methods, it may be helpful to discuss the network and computing environments in which such embodiments may be deployed, including a description of components and features suitable for use in the present systems and methods. FIG. 1A illustrates one embodiment of a computing environment 101 that includes one or more client machines 102A-102N (generally referred to herein as "client machine(s) 102") in communication with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can manage client/server connections, and in some cases can load balance client connections amongst a plurality of backend servers. The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; an Adobe Flash control (formerly called Macromedia Flash and Shockwave Flash) for production of animations, browser games, rich Internet applications, desktop applications, mobile applications and mobile games; a Java applet; software related to voice over Internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The computing environment 101 can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS 7, 8, or 10 manufactured by Microsoft Corp. of Redmond, Wash., UNIX, LINUX, or OSX manufactured by Apple of Cupertino, Calif.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL or IPSec VPN server; a firewall; a web server; an application server or as a master application server; a server 106 executing an active directory or LDAP; or a server 106 executing an application acceleration program that provides firewall functionality, application functionality, or load balancing functionality. In some embodiments, a server 106 may be a RADIUS server that includes a remote authentication dial-in user service. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; GSM/UMTS/LTE networks of the Universal Mobile Telecommunications System (UMTS); a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; 3G; 4G; or any other protocol able to transmit data among mobile devices.

Figure 1B:
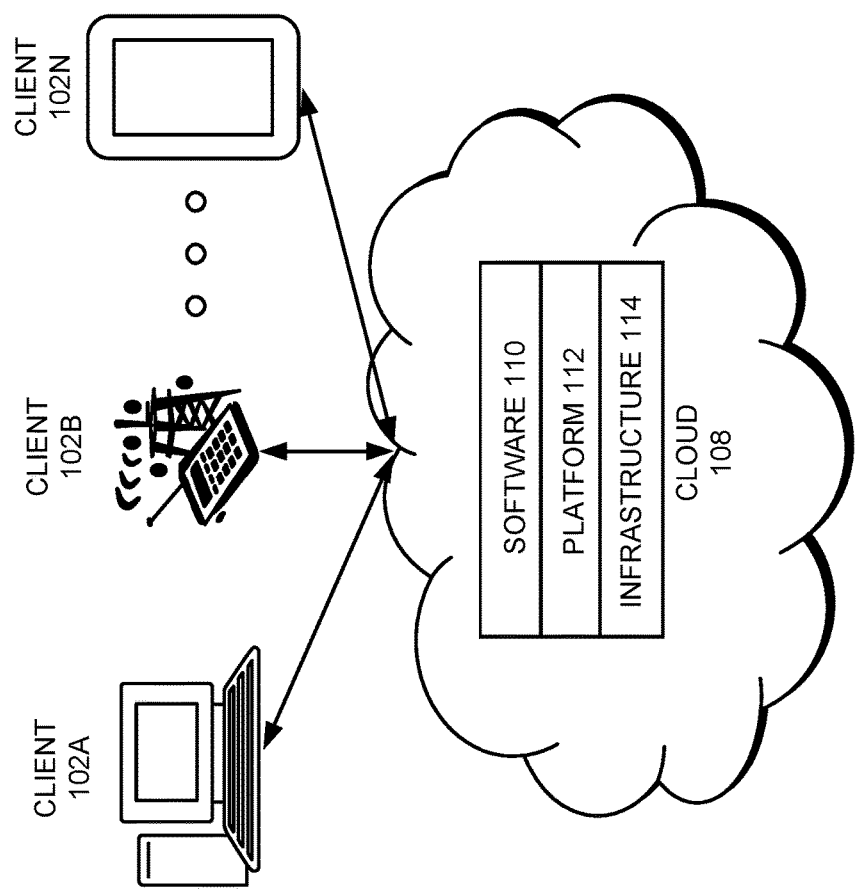
FIGS. 1B-1D are block diagrams depicting embodiments of computers useful in connection with the methods and systems described herein.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and an authentication manager 202. The I/O controller 123, in some embodiments, is further connected to a key board 126, and a pointing device 127. Other embodiments may include an I/O controller 123 connected to more than one input/output device 130A-130N.

Figure 1C:
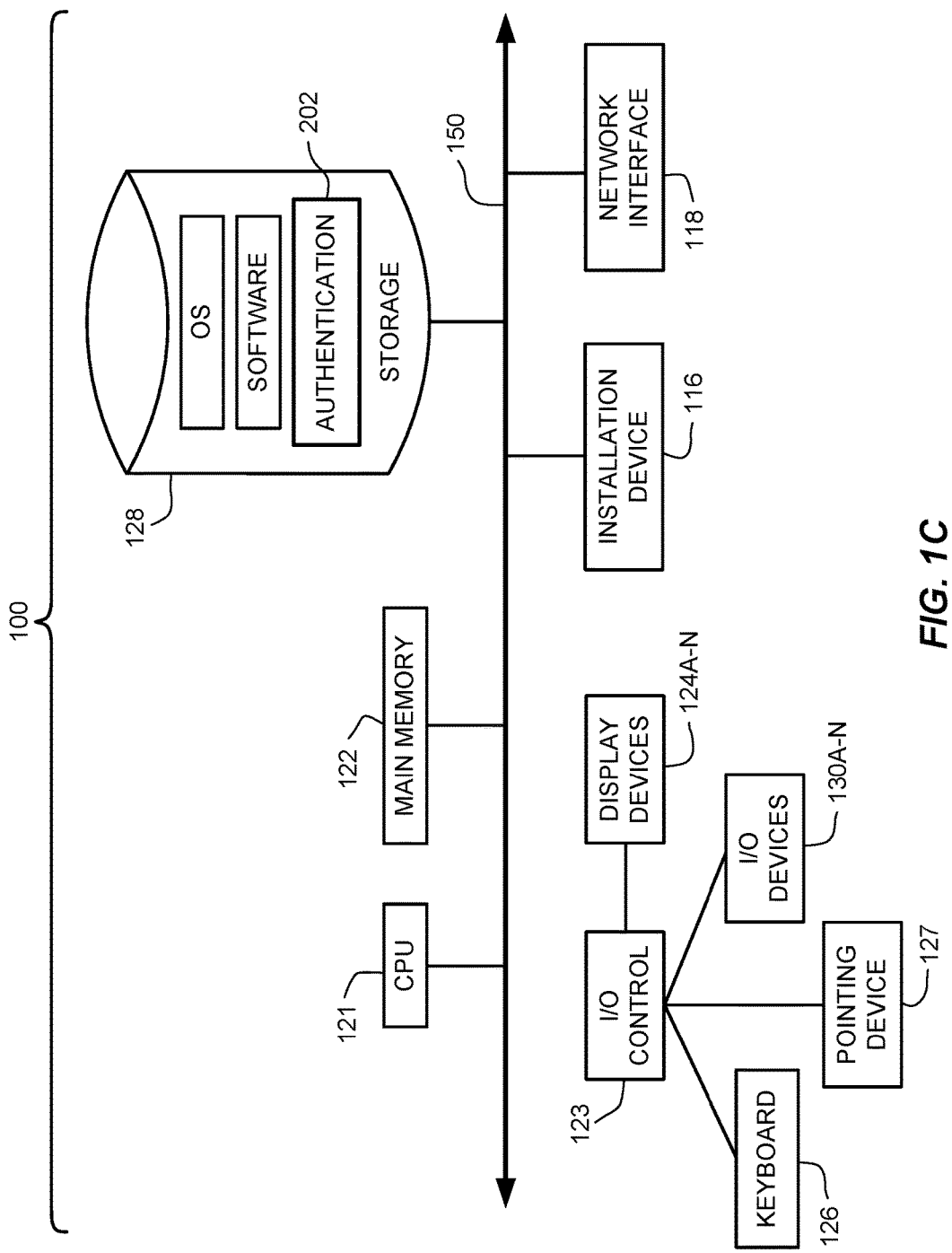
Figure 1D:
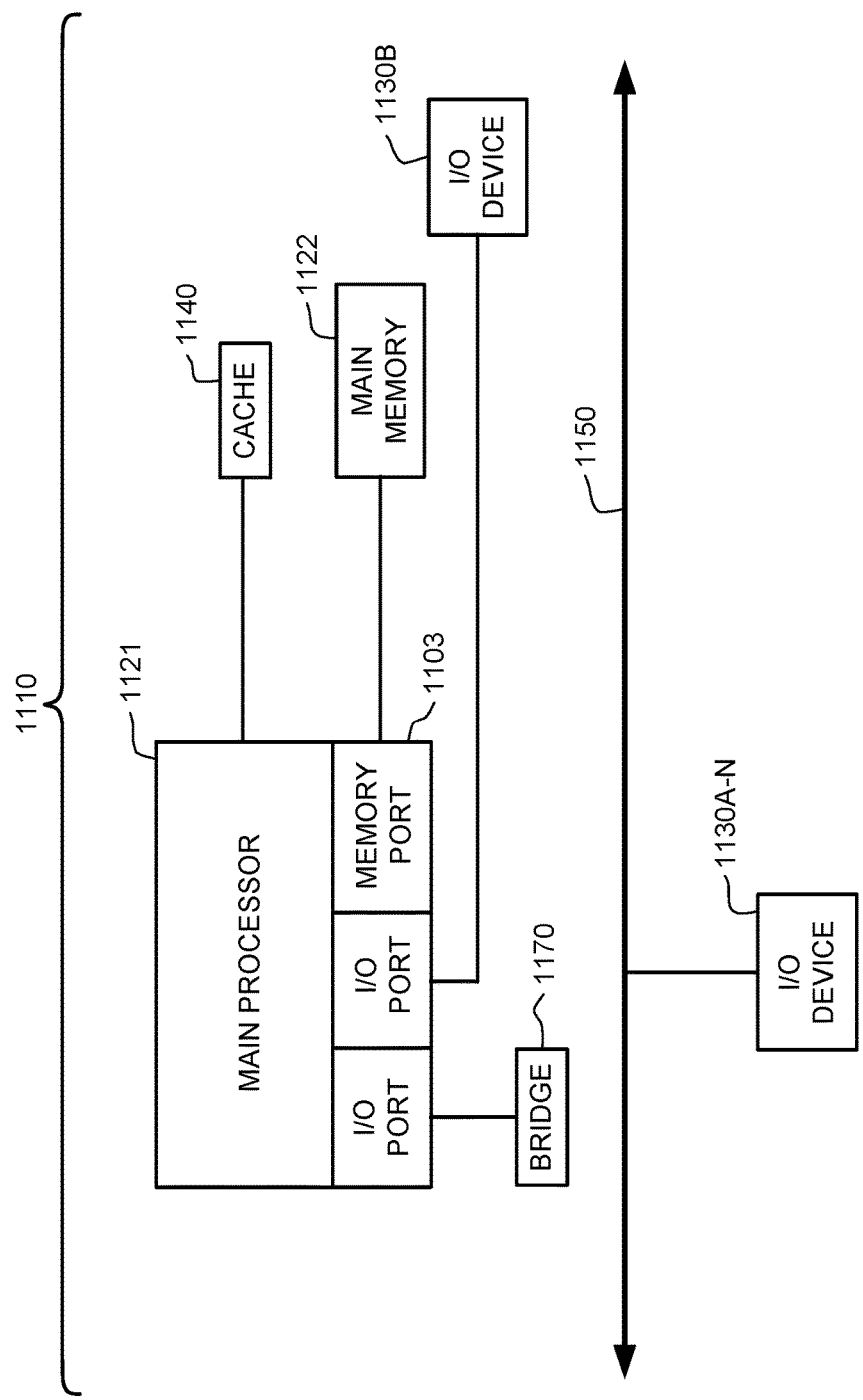

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121 may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include an image processor, a graphics processor or a graphics processing unit. The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a MicroChannel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or SynchBurst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAIVI); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include identification (ID) authentication software 120. The computing device 100 may further include a storage device 128 that can be either one or more hard disk drives, or one or more redundant arrays of independent disks; where the storage device is configured to store an operating system, software, programs applications, or at least a portion of the identification (ID) authentication software 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can execute any operating system, while in other embodiments the computing machine 100 can execute any of the following operating systems: versions of the MICROSOFT WINDOWS operating systems; the different releases of the Unix and Linux operating systems; any version of the MAC OS manufactured by Apple Computer; OS/2, manufactured by International Business Machines; Android by Google; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook, a tablet; a device of the IPOD or IPAD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA); any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; an Android phone; or any other handheld mobile device. Having described certain system components and features that may be suitable for use in the present systems and methods, further aspects are addressed below.

B. System and Method for Authentication of Physical Features on Identification Documents Referring to FIGS. 2-8E, the systems and methods of the architecture, process and implementation of ID document authentication will be described. In general, the present disclosure discusses a solution for automatically authenticating ID documents, such as driver's license and other government (and non-government) supplied IDs. A client device of the system can be configured to operate on smartphones, tables, and other mobile devices. The client device can capture an image of a candidate ID and upload the image to an authentication server of the system. The server can process the image to extract physical characteristics of the ID document. In some implementations, the server extracts physical characteristics of one or more objects or patterns on a face of the ID document, such as a barcode. The server can analyze the extracted physical characteristics and compare the extract characteristics against a database of characteristics extracted from known valid ID documents. Based on the comparison, the server can make a determination of whether the ID document is fake and return the result to the client device.

Figure 2:
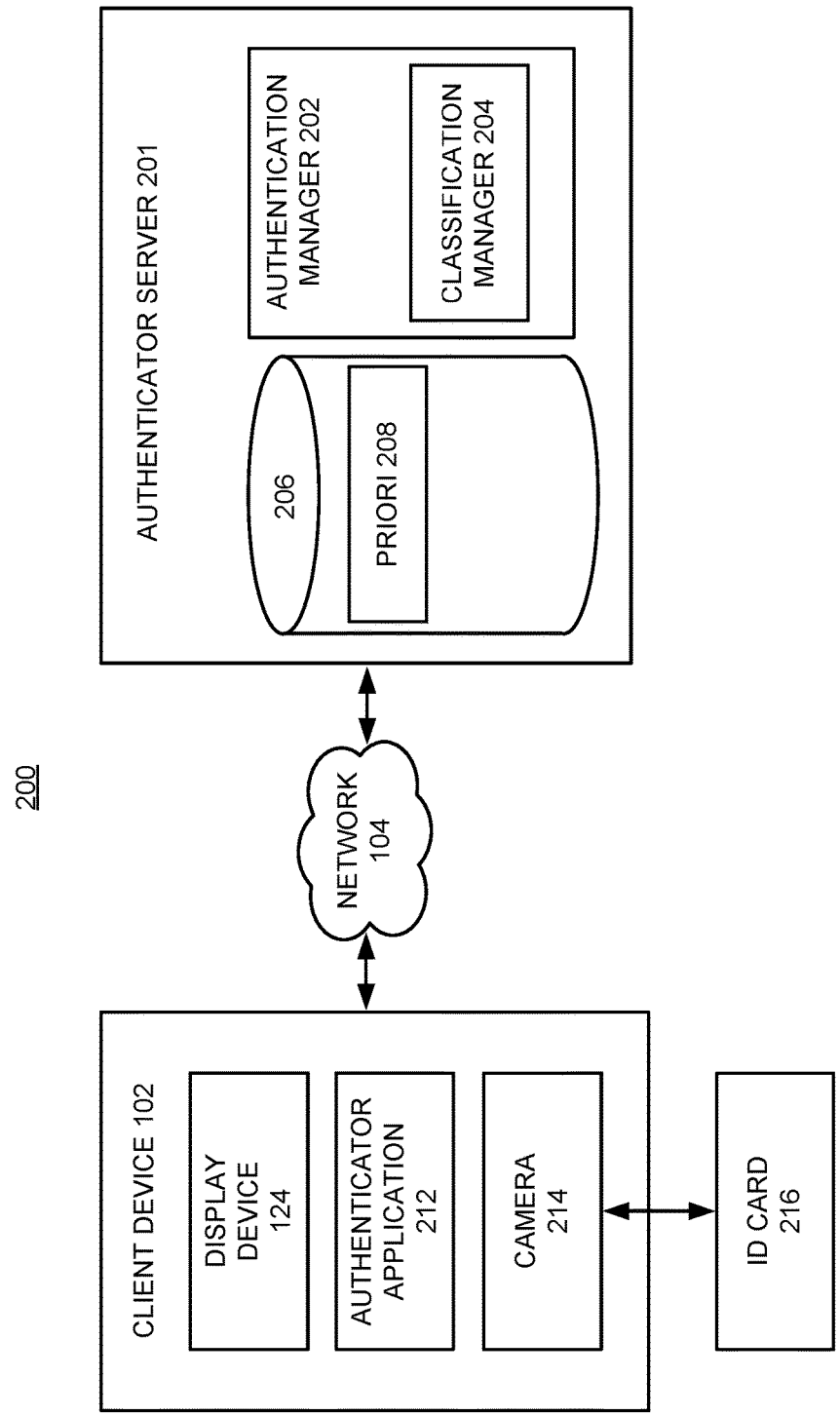
FIG. 2 illustrates a block diagram of a system for authenticating identification (ID) documents in accordance with an implementation of the present disclosure.
Figure 5:
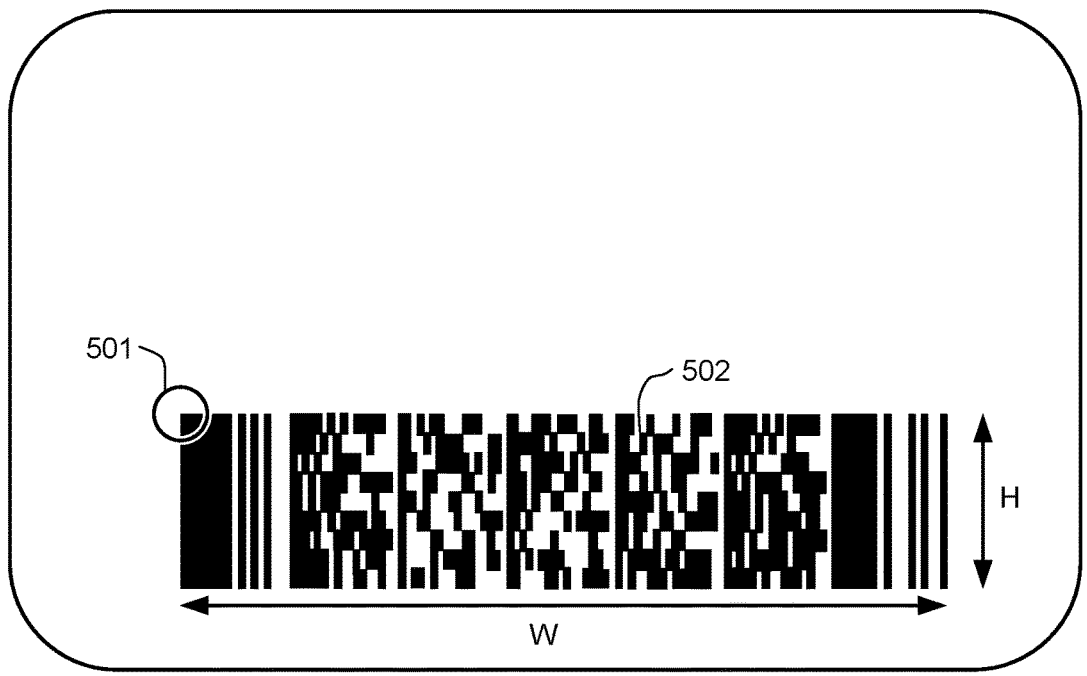
FIG. 5 illustrates the placement of an example barcode on an ID document in accordance with an implementation of the present disclosure.
Figure 6:
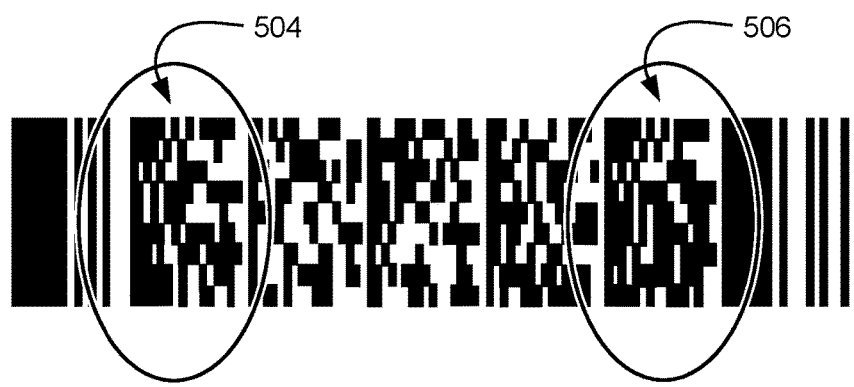
FIG. 6 illustrates an example barcode in accordance with an implementation of the present disclosure.

FIG. 2 illustrates a block diagram of a system 200 for authenticating identification documents. The system 200 can include a client device 102 that is in communication with an authentication server 201 via a network 104. The authentication server 201 executes at least one instance of an authentication manager 202. The authentication manager 202 includes a classification manager 204. The authenticator server 201 also includes a database 206 that stores a data structure of priori knowledge sets 208 that are used to analyze IDs 216.

The system 200 can also include one or more client devices 102. Each client device 102 executes an instance of the authenticator application 212. Each client device 102 may include a camera 214 for scanning or otherwise reading an ID document 216 (also referred herein as ID cards), and a display device 124 for presenting or displaying a copy of the scanned ID card and authentication results. In some implementations, the authenticator application 212 can perform part or all of the authentication analysis described herein. In other implementations, the authenticator application 212 can transmit a copy of the scanned ID to the authenticator server 201, which can analyze the image and can return a result to the client device 102 and authenticator application 212.

Each and/or any of the components of the authenticator server 201 and authenticator application 212 may include or be implemented as one or more applications, programs, libraries, scripts, services, processes, tasks and/or any type and form of executable instructions executing on one or more devices or processors.

The client device 102 is configured to captured an image of the ID card in some electronic manner. For example, if the client device 102 is a smartphone with a built in camera, the authenticator application 212 can use the smartphone's camera to capture an image of the ID card. In other implementations, the client device 102 can couple to another device such as a stand-alone still or video camera or scanning device to capture images of the ID card. The original image of the ID card captured may be larger than the ID card 216 (e.g., include unnecessary background portions) and the ID card may be extracted from the original image. For example, the background or other parts of the image that are not part of the ID card may be automatically or manually removed. This process may involve some image processing such as rotation, deskewing, cropping, resizing, and image and lighting correction to obtain a proper orthogonal image with the proper aspect ratio for the document type in question.

In some implementations, the authentication manager 202 is configured to conduct a training phase where physical features of known real IDs are determined by a measurement process. For example, physical characteristics relevant for 2D barcodes can include location, size, and aspect ratio of barcode and barcode elements, number of groups, rows, columns, specific state security features, encryption markers, or any combination thereof are captured and analyzed from known real IDs. These features are stored for further use in an authentication phase as priori knowledge sets 208 in the database 206. In some implementations, the priori knowledge sets 208 are updated as the system 200 scans and analyzes additional ID cards 216.

As further described below, the client device 102 and the authenticator server 201 can then be used to authenticate ID cards 216. As an overview, a candidate ID 216 card is captured as an image via the camera 214 and transmitted to the authenticator server 201, which can determine a degree of confidence that the ID card 216 is real. The authenticator server 201 can derive a set of features based on physical characteristics that can include characteristics of a 2D barcode on the ID card 216. The image is classified as to type by the classifier manager 204 and its specific type is determined. For authentication, the features (e.g. those from the 2D barcode) are compared to features for reals IDs (obtained in the training phase) for that specific ID type. Differences between the candidate and real feature sets are computed, and the difference is used to calculate a confidence level that the ID is genuine. A threshold can be used with this confidence level to determine if the ID will pass or fail.

The use of fake IDs is a large issue in many business sectors such as underage drinking prevention, visitor management, ID retail fraud, employment authorization, etc. The fake IDs utilized today are obtainable over the internet for low cost and are remarkably close in appearance to the genuine article—even to the point that law enforcement personnel have difficulty distinguishing the real from the fake.

Compounding the problem is the huge variety of government IDs that are issued. For instance, each state has a distinctive design and information layout. Commonly there are multiple design varieties from the same issuer in circulation simultaneously. In addition, within a particular ID issue, there are multiple types such as driver's licenses, identification cards, learner permits, commercial licenses, and usually vertical format license for those under 21 years of age (in the US). Each type of license may incorporate different and varied types of security features.

Thus, anyone inspecting an ID has a difficult task—even if they have received specialized training. Often, the ID checker is under pressure to process the ID quickly. If done manually, they may utilize magnifiers or special lighting (e.g. UV) to do a better job at examining some of the security features embedded in the IDs. But careful human inspection of IDs can be slow and subject to error. To assist in the process, over the years, specialized equipment has been developed to help automate the inspection process. The technology described herein can find use in such automated authentication systems to help identify false documents.

Organizations such as the American Association of Motor Vehicle Administrators (AAMVA) have issued standards for ID layout, information formats, and suggested security features. In the US, the REAL-ID Act has helped to push ID issuers in the US to produce licenses produced under more secure conditions and with more security features. However, fake ID producers have also gotten much more sophisticated in duplicating the security features on real IDs including holograms, ultraviolet features, ghost images, microprint, laser perforation, raised printing, variable font-size printing, kinegrams, and barcodes.

Barcode scanners use a number of technologies from using a scanning laser to capture of the image and reading with software. But the basic idea is to convert the barcode into a text string. For certain applications such as license reading, the task is then to parse out this string into fields such as name, address, and other relevant information about the person located on the front of the ID that is readable to the naked eye alongside their photo.

In the early days of fake ID's, it was difficult to generate a PDF-417 barcode with the correct information. Comparing the barcode info to the front of the ID info was often an effective technique for fake detection. For driver's licenses in the US and Canada, there is an AAMVA standard that makes recommendations on the layout, header information, fields, delimiters, etc. and specifies the precise format of the barcode information. Even with standardization, different issuers include different information and in different order. The standard is a two edged sword—making available the format to those who wish to duplicate it. Barcode generators are now readily available even online to generate a credible looking 2D barcode that is scan-able with most barcode readers. Such a barcode will decode into a legal text string and likely into acceptable parsed data fields.

The current generations of fake IDs have credible printing and color matching, holograms, UV features, and barcodes that scan similar to real IDs. Fake ID producers even advertise their product as being able to "pass barcode scanning." The ability to be scanned successfully is no longer sufficient to detect fake IDs. This has spawned an era of newer "reader-authenticators" which are based on high resolution imaging of both the front and back of the ID. In this case, the barcode could be decoded from the image rather than from the traditional technique of laser scanning.

In some implementations, the ID card 216 can include a barcode, such as a PDF-417 barcode. The PDF-417 2D barcode format has been adopted as the standard format for machine readable data in US and Canada driver's licenses and indeed for most of the ID-1 sized cards in the world. This format has the advantages of being able to contain a lot of data, has redundancy in case part of the code is damaged or dirty, and can be read with a variety of devices including laser and image based scanners. FIG. 3 illustrates an example PDF-417 2D barcode 300.

The PDF-417 is 2D a stacked barcode symbology and has become the default standard for encoding information on US driver's licenses. The barcode can include of linear rows of stacked code words. The nomenclature PDF-417 (Portable Data File 417) comes from the fact that each code word consists 4 black bars and 4 white spaces of varying lengths within a horizontal grid of 17 positions. There can be from 3 to 90 rows, and each row can be considered a kind of linear 1D barcode. Within a row, there can be from 1 to 30 code words. No two successive rows are the same except for within the start and stop patterns.

The minimal element in a code word is a module, which is the grid element in a row within the 17 columns of the code word. There is a recommendation that the module's height be 3 times its width. However, different barcode issuers utilize different height to width ratios in their barcodes and this sometimes results in perceptually different looking barcodes. See the two examples below which have very different overall and element sizes. For example, FIGS. 4A and 4B illustrate the different height to width ratios used by different states. FIG. 4A illustrates a portion 302 of a PDF-417 barcode from a South Carolina driver's license and FIG. 4B illustrates a portion 304 of a PDF-417 barcode from a Mississippi driver's license.

While, in some situations, the size of a black module would be the same size as a white module, this does not always hold true. In some cases, the quality of the printing is an important factor affected by the type of printer, printer supplies, temperature of the print head, etc. This variability can lead to black ink bleed or shrinkage and lead to wider black space elements and thus narrower white space elements and vice versa. Most barcode readers try to deal with this element of variability.

The first element in a given code word is always black (the beginning element of the first of four bars in the code word) and the last element in a code word is always white (the end element of the last of four spaces in the code word). This property makes the divisions between code words fairly visible to the eye. The sets for code words stacked vertically may be referred to as a group. The number of groups varies with how the barcode is generated but can be somewhat controlled via the input parameters to the barcode generator.

A PDF-417 barcode always begins with a fixed start pattern and ends with a fixed, but different, stop pattern. The start pattern might be considered a fixed group since it is generally the same width as the code word groups and consists of 4 bars and 4 spaces just like the other code words. The start pattern is the same in all rows. The stop pattern is similar to the start pattern but has one extra minimal width bar at the end. The start and stop patterns allow the reader to determine the orientation of the barcode easily.

The left row indicator group may not contain the actual text encoded in the barcode but rather other parameters such as the number of rows and columns, etc. in the barcode. The right row indicator may also not contain the actual text.

The number of code words on a line can be set at generation time. There are also different compaction modes, and different correction levels. Depending on the number of code words across (groups), the type of compaction, and the correction levels chosen, the actual 2D printed barcode can look quite different even though the actual encoded string is identical.

The actual physical position of the barcode on an ID card is one example of a physical characteristic and is substantially consistent within the same issuer (e.g., a state's division of motor vehicles). In US IDs, the barcode is printed on the back of the ID. AAMVA standards have recommendations for barcode placement and size, but there is considerable variability among issuers. The back of IDs is generally less colorful than the front and thus less potential interference with the variable material printed in black ink there such as a 2D barcode. Blank cards may already have a design printed on them, and the variable information is printed in a separate pass. Some issuers may print the variable information on an overlay or cover the printed information with an overlay.

The barcode height and width are also generally fixed within a given issuer. Some issuers, during the same general issued series (on the front of the ID), have decided to include more information in the barcode on the back and thus there may be multiple sizes of barcodes issued within the same series. One example of this is the Massachusetts 2010 series where IDs issued past a certain date were of a larger size.

While forgers have easy access to 2D barcode generators for the PDF-417 symbology, unless they choose the exact same parameters in all these dimensions as used in the real document, the barcode will vary somewhat physically in appearance from a genuine document.

While the examples provided herein detect false IDs based on the physical characteristics of barcodes, such as the PDF-417 barcode standard, any other type of barcode may be used (e.g. Code 39, Code 128, and others), as well as other fixed and variable type patterns found on the front or back of IDs. The difference between conventional authentication techniques, which use methods such as pattern matching to verify the presence of a feature, and this concept is the focus on the relationships between physical elements resulting from the ID issuers unique production process.

In some implementations, the authentication manager 202 can measure certain characteristics of an ID or section of the ID and perform a comparison of those characteristics with characteristics from a genuine ID. The authentication manager 202 can select appropriate and measurable characteristics that are capable of distinguishing real from fake IDs. The strength of the characteristics can vary quite a bit and can depend on how easy or difficult it is for the false document supplier to recognize specific properties and then to recreate the characteristics of the genuine document. It may be easy to create a false document that has the general look and feel of a real document but a suitably designed automatic detection schema can be designed to pick up much more subtle differences that could pass mere human inspection.

In some implementations, the authentication manager 202 can include a classification manager that can determine the class of ID card presented to the system 200. For example, as each US state issues different ID cards, the classification can indicate from which state the ID card was issued. After classifying the ID card's state, the ID card may be sub-classified. For example, states may issue driver's licenses, ID cards, learner's permits, etc.—each of which could be a different subclass under the state's classification. In some implementations, the ID card can be classified into one or more of 410 different document classes in the US in an ID1 format. Classifying the ID card can help the authentication manager 202 select those characteristics that provide the best information for determining the validity of the ID card. The physical characteristics of barcodes (e.g., overall size, location, element size, rows and columns, etc.) vary between different issuers (and thus different classification). These characteristics can be used as features to determine or narrow down the ID type by matching these features against the standard features across all classes to determine a best match or small set of potential matches. By classifying an unknown document to a particular class, it provides a great advantage since the authentication manager can look up the correct features to expect for that particular document. If the document features (e.g. barcode characteristics) are not close enough to the real document, then the authentication manager can determine or judge the document to be not sufficiently close to be accepted as a real document or possibly an altered document.

The authentication manager 202 can also measure certain physical characteristics of the barcode on the ID card and treat the characteristics as features. The features can be compared to the corresponding feature characteristics of genuine (e.g., known valid) documents and known fake documents to make a determination as to whether the unknown document's features are closer to the real or the fake set of features.

The authentication manager 202 can analyze one or more characteristics of the ID card to determine the validity of the ID card. False documents typically will have characteristics that will not match real documents in one or more of the following features. The features can include the physical location and size of the barcode on the ID. This feature can use an ID document's conformance to established size standards (ID1, ID2, . . . ) to help make a determination as to the document's validity. Given this knowledge, the DPI value can be determined from the image and used as a ruler to locate, measure distance, scale, and size. 2D barcodes will generally be of fixed width and height. It is possible however for an issuer to modify the size within a particular issue—if they decide to add more information fields. For example, Massachusetts has two different barcode heights within the same issue. Fake barcodes will often not be the correct size or in the exact correct location.

To derive these features, measure the physical location and/or size of the barcode in pixel units. For example, and referring to FIG. 5, the X, Y location 501 relative to the edge or corner of the document or relative to some other fixed anchor point can be found, and then the size (height and width) of the barcode 502 can be measured. Given the (dots per inch) DPI of the image, these measurements can be converted into physical units such as inches or millimeters. Comparisons, made in physical units, result in resolution independence.

Another characteristic can be the height to width ratio of the barcode. The measure of the ratio of the height to width of the barcode can be referred to as the aspect ratio of the barcode. This feature can be size invariant but can depend on having an image capture process that will generate an image with the correct overall aspect ratio for the document.

Another characteristic can be the number of code groups horizontally in a barcode. This is related to the number of columns for the 2D barcodes. A related characteristic can be the number of columns horizontally in a barcode. Generally, this can be related to the number of code words since there are a fixed number of module elements within a horizontal code group for PDF-417 barcodes. Each code group can include of 17 elements.

Another characteristic can be the number of rows in a barcode. This is a characteristic that is often misproduced by forgers. By creating a table of rows and columns for known ID types, this can be used for comparison for candidate IDs.

Another characteristic can be the module element size. The module element is the smallest barcode element and can be either a white or black module. White and black modules can have different measured sizes due to printer variations and dye/ink characteristics.

Another characteristic can be the ratio of black and white module element sizes. A valid barcode does not necessarily have the same size black and white module sizes due to printer variations and dye/ink transfer characteristics.

In some implementations, the smallest elements in a 2D barcode can have a fixed aspect ratio and size. As stated, the size of the smallest black elements and white elements may also vary from each other due to the type of printer, printer element temperature or other factors, and the relative size may also be a distinguishing characteristic, if stable for that type of ID. The height to width ratio of the smallest module element size is supposed to be on the order of 3 to 1. However, this ratio varies substantially for different IDs. As seen in the earlier example, the ratio varies from approximately 5-1 for South Carolina to 1-1 for Mississippi. Hence, it becomes a distinguishing property for that Issuer.

Additional data encoded in the barcode can also be used as characteristics for analyzing the validity of the ID card. The barcode can include data that is not related to the owner of the ID card. This data can include an encryption level, size of the barcode, number of rows and columns, and row and column information, and other characteristics.

In some implementations, the authentication manager 202 can use template matching to make physical measurements of the many characteristics described above. For instance, a template match of the upper left corner and lower right corner of a barcode can be used to determine the size of the barcode. Either corner could be used to define the location.

A count of average gray value for each horizontal position and subsequent peak detection can be used to determine the number of groups horizontally. Histogram analysis can be used to measure rows and modules.

Pattern matching can also be used by the authentication manager 202 to determine if patterns in the barcode match expected codes. For example, and also referring to FIG. 6, because the left most PDF-417 group 504 can contain some of the basic encoding features (e.g. row and column information), and not the actual data, the pattern for this group is can constant across IDs of a given classification. A pattern match done on just this first group could detect fake IDs that do not encode the barcode correctly. Likewise, and also referring to FIG. 6, the Right Row Indicator 506 can normally remain constant within a particular document class and pattern matching on this element could be used as a feature.

Filler data in the barcode can also be used by the authenticator manager 202 as a characteristic. In some 2D barcodes, there are areas with repeating code words that are used as filler data. This comes about due to the variable amount of data encoded into a given barcode combined with the need to maintain a fixed physical size of barcode as well as number of rows and columns. A pattern match on the filler code word patterns to see if they match those found on real IDs could be used as a feature.

In some implementations, the decoding process can be used as a characteristic. The decoder can know predetermined information about the barcode to enable the decoder to decode the barcode. If the barcode reader detects deviation from the expected values, those deviations can be used as characteristics.

Figure 7:
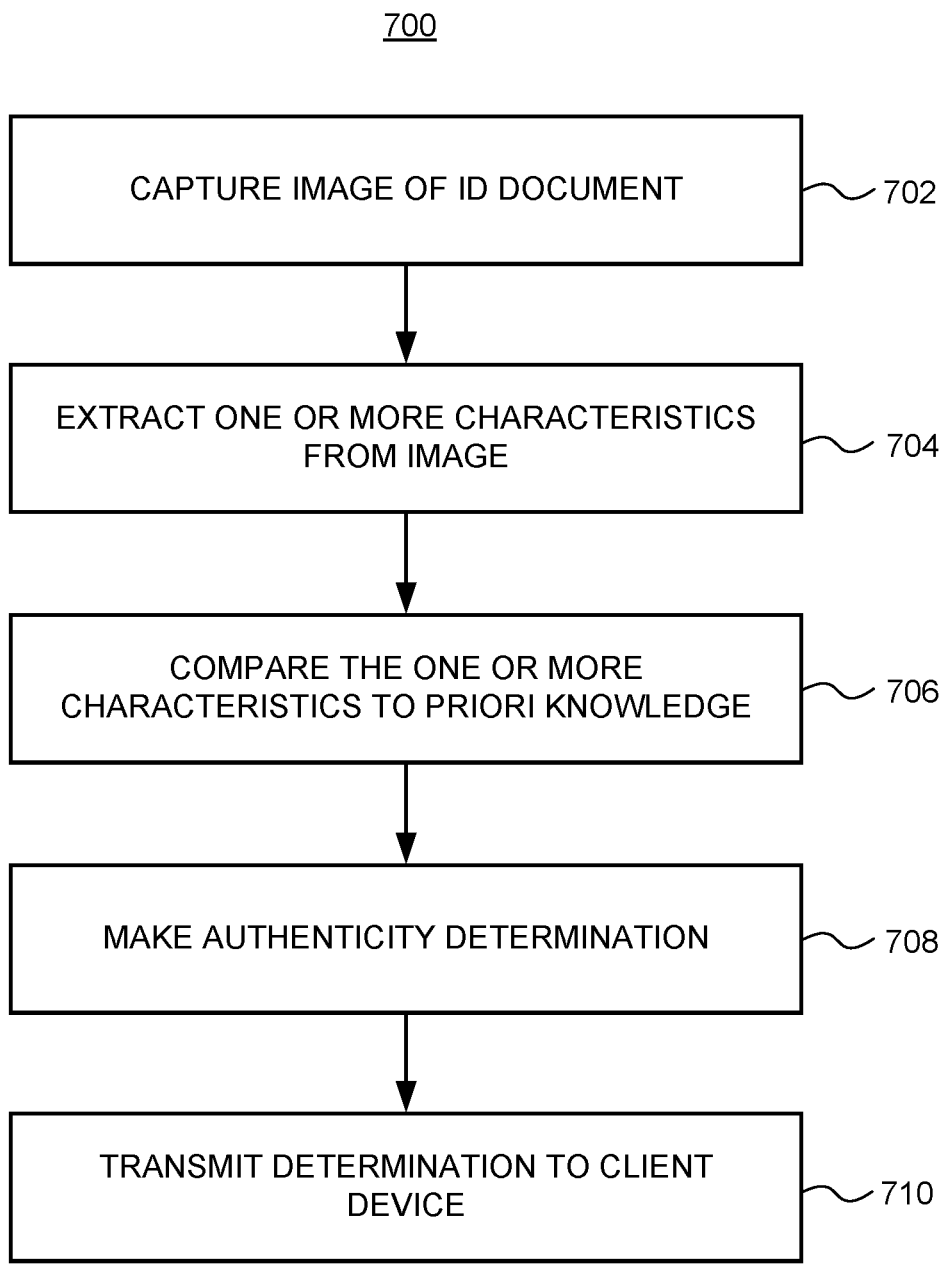
FIG. 7 illustrates a block diagram of a method for authenticating an ID document in accordance with an implementation of the present disclosure.

FIG. 7 illustrates a block diagram 700 of a method for authenticating an ID document. The method can include capturing an imaging of an ID document (BLOCK 702). The method can include extracting one or more characteristics from the image of the ID document (BLOCK 704). The one or more characteristics can then be compared against priori knowledge (BLOCK 706), and an authenticity determination can be made (BLOCK 708). The authenticity determination can be transmitted to a client device for display (BLOCK 710).

Figure 8C:
FIGS. 8A-8E illustrate screen shots of an instance of the authenticator application determining the authenticity of a ID document.
Figure 8B:
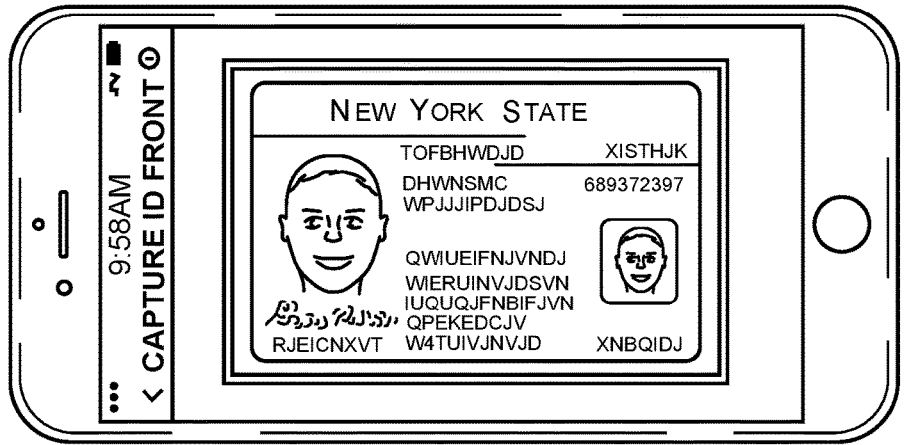
Figure 8A:
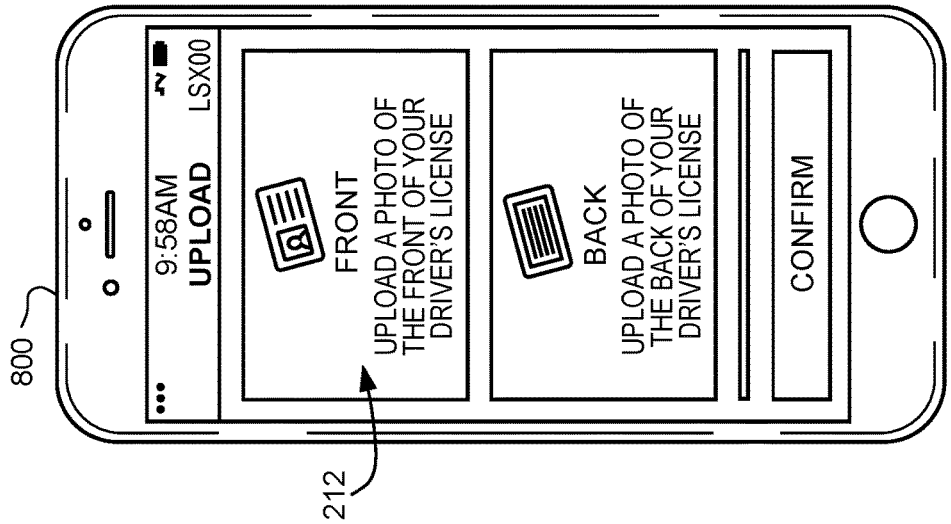

As set forth above, the method can include capturing an image of an ID document (BLOCK 702). The image of the ID document can be captured by a client device. For example, the authenticator application discussed above can be executed by a smartphone or tablet computer. The authenticator application can use the smartphone's built in camera to capture an image of the ID document. For example, and also referring to FIGS. 8A-8C, a smartphone 800 can execute an instance of the authenticator application 212, which can present the user with a prompt to capture an image of the front and back of an ID document. FIG. 8B illustrates the user capturing the front of the ID document and FIG. 8C illustrate the user capturing the back of the ID document. As illustrated in FIGS. 8B and 8C, and described above, the authenticator application 212 can remove the background and other portions of the images from the captured image to leave substantially only the ID document in the captured image. The authenticator application 212 can also rotate, de-skew, and otherwise correct the captured image to prepare the image for processing.

The method can also include extracting one or more characteristics from the captured image (BLOCK 704). In some implementations, the characteristics are extracted by the authenticator application 212 executing on the client device. In other implementations, the client device can transmit the image to a remote server, e.g., the authenticator server, where the characteristics are extracted by an authentication manager. The extracted characteristics can be any of the characteristics described herein. In some implementations, the authentication manager can classify the captured ID document and determine to which class and subclass the ID belongs. Based on the classification, the authentication manager may select predetermined characteristics from the captured image. For example, after classifying the ID document as a driver's license from Ohio, the authentication manager may reference a lookup table to determine which characteristics are most beneficial to use in determining the validity of an Ohio driver's license and then extract those characteristics form the image.

The method can then compare the extracted characteristics to priori knowledge (BLOCK 706). The authentication manager can include a machine learning algorithm that is configured to determine whether the extracted characteristics match those extracted from known valid ID documents. The method can include making an authenticity determination (BLOCK 708) based on the comparison. In some implementations, the determination is binary and returns a VALID or INVALID determination. In other implementations, the authenticity determination may be a range indicating the likelihood the ID document is valid. The range can range from 0% (e.g., not valid) to 100% (valid). The range may include a threshold (e.g., 75%) over which the document is determined valid or likely valid.

Figure 8E:
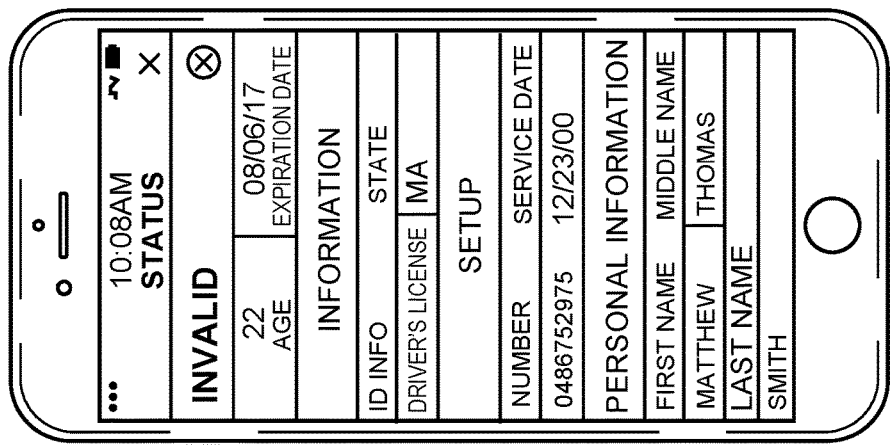
Figure 8D:
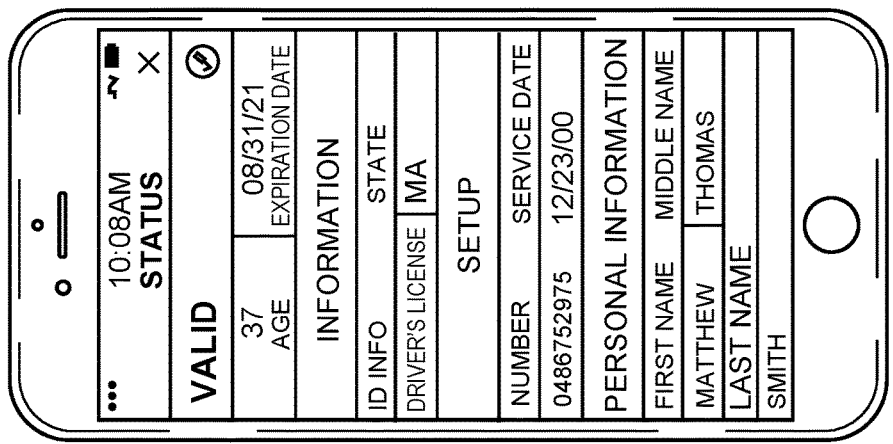

The method can also include transmitting the determination to the client device (BLOCK 710). FIGS. 8D and 8E illustrate example results of the determination being transmitted back to the client device. FIG. 8D illustrates the authenticator application displaying a valid determination after determining a presented ID document is valid. As illustrated, the authenticator application can also display additional information, such as the classification and personal information either determined by the authenticator server or extracted from the barcode on the ID card. FIG. 8E illustrates an example of the authenticator application displaying an invalid determination.

C. System and Method for Authentication Identification Documents with Convolution Neural Networks In addition to authenticating an ID document based on the extracted physical and visual characteristics of the ID document (as described above), the present solution can also classify and authenticate ID documents based on captured images of the ID documents. In some implementations, the ID documents are classified and authenticated using artificial intelligence, such as convolution neural networks. The system can also normalize the images of the ID documents to reduce or remove physical challenges (e.g., the damage to the document) and environmental challenges (e.g., removing glare from the image).

Figure 9:
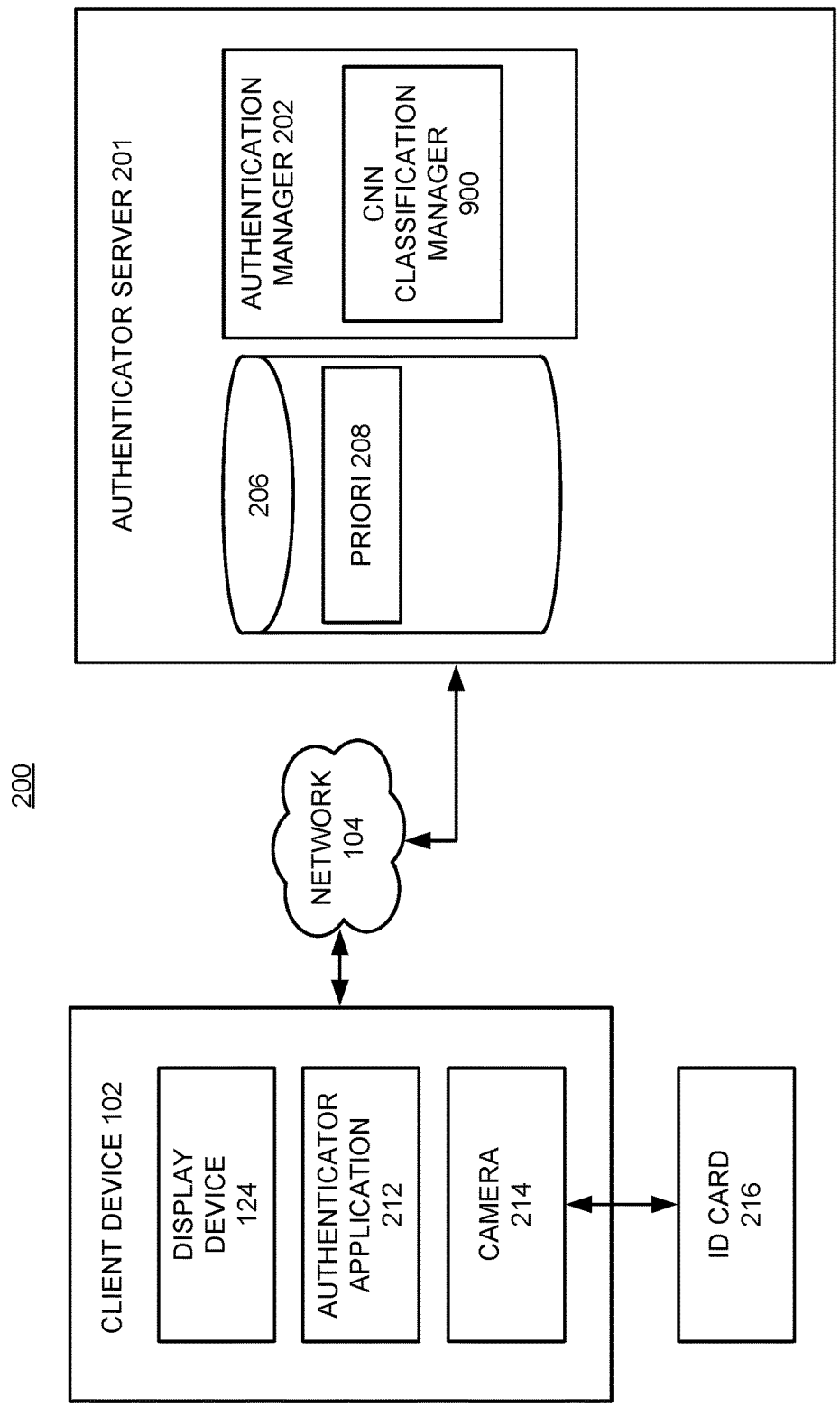
FIG. 9 illustrates a block diagram of a system for authenticating identification documents.

FIG. 9 illustrates a block diagram of a system 200 for authenticating identification documents. The system 200 can include a client device 102 that is in communication with an authentication server 201 via a network 104. The authentication server 201 executes at least one instance of an authentication manager 202. The authentication manager 202 includes a convolutional neural network (CNN) classification manger 900. The authenticator server 201 also includes a database 206 that stores a data structure of priori knowledge sets 208 that are used to analyze IDs 216 (e.g., the authenticator server 201 can compare the features to priori knowledge sets 208 for the determined class). The system 200 is similar to the system 200 described above and can include any of the components described above in Section B.

In addition to the above described components, the system 200 can include a CNN classification manager 900. The CNN classification manager 900 can classify and authenticate ID documents based on data contained on the face of the ID documents. In some implementations, the accuracy of authenticating an ID document is increased by first classifying an unknown ID document to a particular class before performing the authentication process. The classes can include different classes for each state, year, issuing agency, or other organizational hierarchy. Each class can also include subclasses. For example, a driver's license subclass, a learner's permit subclass, and an identification document subclass. Classifying the ID document into a class (and subclass) can increase the accuracy because the authenticator server 201 can analyze and compare specific features of the unknown ID document to the corresponding features of ID documents within the matching class know to be authentic. For example, the CNN classification manager 900 can determine the unknown ID document is within the class of Massachusetts identification documents and the subclass of a learner's permit. The authenticator server 201 can then compare the unknown ID document to priori knowledge sets 208 that correspond to Massachusetts learner's permits.

The CNN classification manager 900 can classify each face of an ID document separately. For example, the CNN classification manager 900 can determine a class and subclass (e.g., the Type, Class, Stock, Year) of any front image and any back image of an issued identification document. The CNN classification manager 900 can compare determined class (or subclass) for the front face (e.g., front side) and the back face (e.g., back side) of the ID document. The CNN classification manager 900 can use the comparison of the determined class (or subclass) for the front face and the back face of the ID document in authenticating the ID document. For example, if the class of the front face does not match the class of the back face, the CNN classification manager 900 can flag the ID document as fraudulent or unauthentic. The CNN classification manager 900 can ensure that the back of one ID document is not combined with the front of another ID document.

The CNN classification manager 900 can use convolutional neural networks (CNN) to determine the validity of the identification document. The CNN (also referred to as a ConvNet) is a type of artificial neural network in which the connectivity pattern between the CNN's neurons are inspired by the organization of the animal visual cortex. For example, the individual neurons can be arranged in such a way that the neurons respond to overlapping regions tiling the visual field. The CNN classification manager 900 can apply convolution to an identification document in two dimensions—that is the width and height of the image. The CNN classification manager 900 can mix two digital assets of information. The first digital asset can be the input image, which can have a total of three matrices of pixels. The pixel matrices can correspond to the red, blue, and green color channels. Each pixel in each matrix can be an integer value—for example, between 0 and 255. The second digital asset can be a convolution kernel. The convolution kernel can be a single matrix of floating point numbers where the pattern and the size of the numbers can be a formula for how to intertwine the input image with the kernel in the convolution operation. The output of the kernel is the altered image, which can be referred to as called a feature map. In some embodiments, there are multiple feature maps; one for each channel (e.g., color channel). For example, the process can generate red, blue, and green feature map for each image. The feature maps for the different channels can be generated with a kernel selected for each of the respective channels or with the same kernel.

The CNN of the CNN classification manager 900 can include multiple layers of receptive fields. For example, the CNN can include a convolutional layer, a pooling layer, a rectified linear unit layer, a fully connected layer, and a loss layer. The kernels can be a small collection of neurons that process portions of the input image. The outputs of the kernels can then be tiled so that their input regions overlap, to obtain a better representation of the original image. Each layer can then process the output of the above layer. Tiling can enable the CNN to tolerate translation of the input image. The CNN's pooling layers can combine the outputs of neuron clusters of related images. They can also include various combinations of convolutional and fully connected layers, with pointwise nonlinearity applied at the end of or after each layer.

In some implementations, a convolution operation on small regions of input is introduced to reduce the number of free parameters and improve generalization. This can also have the added benefit of high volume transaction processing of the image data due to its small file size and the cloud's larger computational power. One advantage of CNNs is the use of shared weight in convolutional layers, which means that the same filter (weights bank) is used for each pixel in the layer. This can both reduce memory footprint and improve performance and enables various other algorithmic techniques applied against this small image size and pixel inputs. In some implementations, the CNN classification manager 900 selects the weights responsive to the type of identification document that the CNN classification manager 900 is authenticating. For example, the CNN classification manager 900 may use a first set of weights for a Massachusetts driver's license and a second set of weights for a United States passport. The use of different weights by the CNN classification manager 900 can enable the CNN classification manager 900 to tune the authentication process to supplied identification documents.

In one example of generating a feature map, assume an image of a driver's license is captured by the camera 214. The image is 100×100 pixels in size. The kernel for the example is set to 3×3 pixels. An element wise multiplication of a first 3×3 patch of the driver's license image and the 3×3 kernel is calculated to generate one pixel of the ID feature map. The center of the kernel slides one pixel into another direction, and repeats this computation to generate the next pixel of the ID feature map. The computation ends when all pixels of the ID feature map have been computed. In some implementations, the kernel for each of the different color channels is different.

In some implementations, the CNN classification manager 900 can classify unknown ID documents to improve the accuracy of the authentication. In some implementations, the CNN classification manager 900 can classify unknown ID documents by state, province, document type, year, and authentication status. These classifications can become the root document classes. The CNN classification manager 900 can dynamically generate a list of paths for the ID document in each root class. The CNN classification manager 900 can also classify the ID document into subclasses within each of the root classes. The subclasses are also referred to as path classes. In some implementations, the CNN classification manager 900 can calculate environmental factors present in the image. The environmental factors can include, but are not limited to, hue shifts, glare, damage, dirt, shadow hue, offset edges, blur, rotation, and overexposure. The CNN classification manager 900 can normalize the image of the identification document responsive to the calculated environmental factors. For example, an image that includes glare can be normalized to reduce the effect the glare will have on the CNN classification manager's decision.

In some implementations, the CNN classification manager 900 can normalize the identification documents to account for the differences in training data and real-world data. For example, training data can be generated from high-quality scans while real-world data can include images captured with the camera 214 in poor lighting conditions. In one example, the weights of the neural network can be altered until the amount of loss is deemed to be within an acceptable range.

Figure 10:
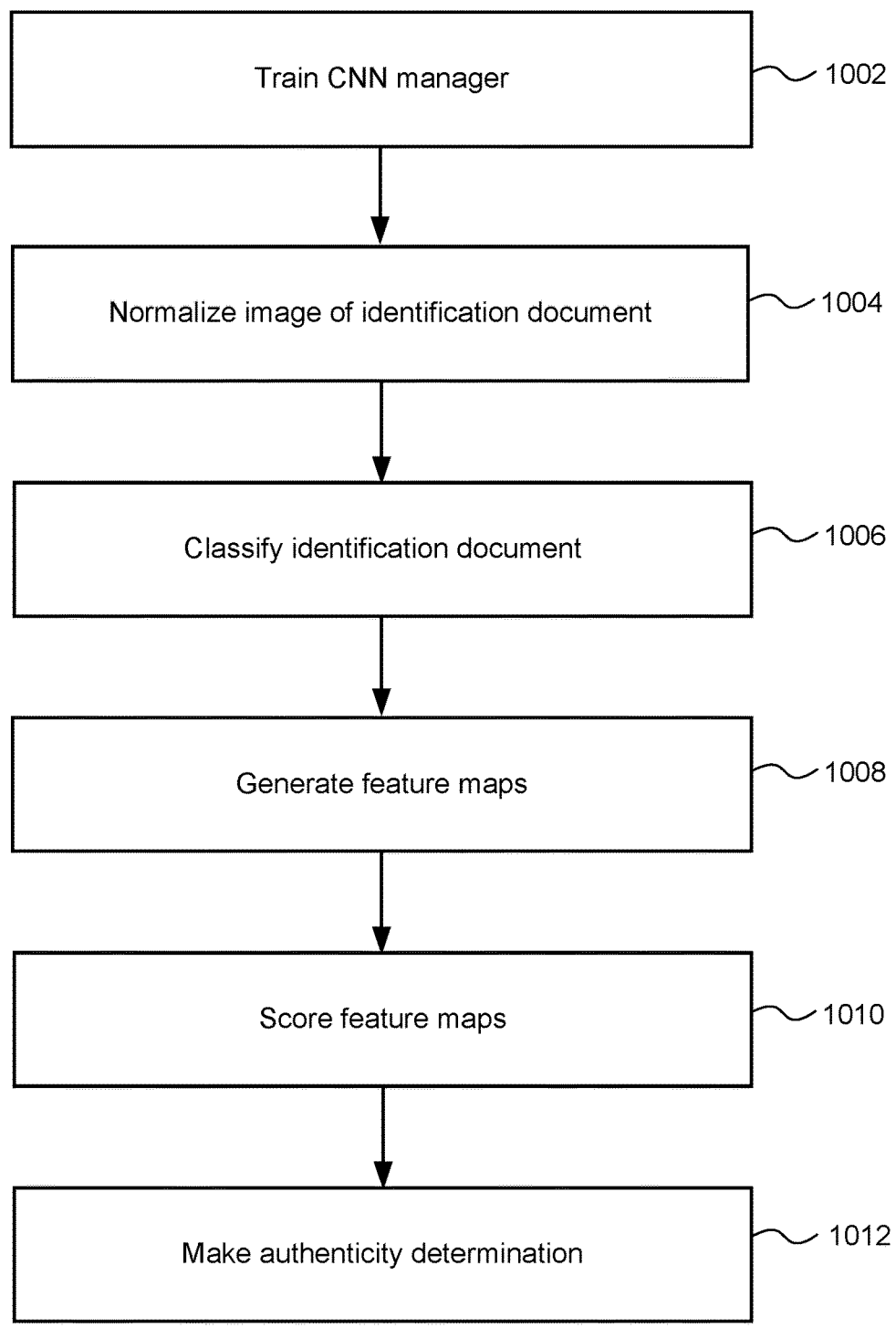
FIG. 10 illustrates a block diagram of a method for authenticating an ID document.

FIG. 10 illustrates a block diagram 1000 of a method for authenticating an ID document. The method includes training the CNN classification manager (BLOCK 1002). The method can include capturing an image of the identification document and normalizing the image (BLOCK 1004). The method can include classifying the identification document (BLOCK 1006). The method can also include generating one or more feature maps for the image of the identification image (BLOCK 1008). The one or more feature maps are scored (BLOCK 1010), and a determination of the authenticity of the identification document is made (BLOCK 1012).

As set forth above, the method can include training the CNN classification manager (BLOCK 1002). Training the CNN classification manager can include providing a plurality of ID documents in each of the document classes and subclasses to the CNN classification manager. For example, a plurality of driver's licenses from each state can be scanned and provided as input to the CNN classification manager. For each of the collection of the scanned images, the images can be pixelated into smaller regions. The CNN can be used to dynamically differentiate data between the different document classes and sub-classes. For example, a plurality of the reference ID documents used for training can be labeled as authentic and a plurality of the reference ID documents used for training can be labeled as fake or invalid. Using a clustering algorithm, the extracted data can be clustered into different classes and then subclasses. Each of the classes and subclasses can include clusters associated with authenticated and invalided reference ID documents. The classes, subclasses, and extracted data can be saved into the authenticator server's database.

Once the system is trained, an image of an identification document can be captured and normalized (BLOCK 1004). The image of the ID document can be captured by a client device. For example, the authenticator application discussed above can be executed by a smartphone or tablet computer. The authenticator application can use the smartphone's built in camera to capture an image of the ID document. For example, a smartphone can execute an instance of the authenticator application, which can present the user with a prompt to capture an image of the front and back of an ID document. In some implementations, the image can be captured by scanning the identification document with a document scanner, flatbed scanner, or other scanning device. The image of the identification document can be normalized. In some implementations, normalization can include removing the background and other portions of the images from the captured image to leave substantially only the ID document in the captured image. The authenticator application can also rotate, de-skew, and otherwise correct the captured image by, for example, removing glare, correcting overexposure, and correcting for blur to prepare the image for processing.

The method can also include classifying the identification document (BLOCK 1006). The authentication manager can classify the identification document into a class and subclass. For example, the CNN classification manager can classify and authenticate ID documents based on data contained on the face of the ID document. The data can include the physical size and location of barcodes, security features (or location thereof), colors, or other features on the face of the ID documents. The sub-classes can include, among others, different classes for each state, year, issuing agency, organ donor, veteran status, or other organizational hierarchy.

The method can also include generating feature maps (BLOCK 1008). As described above, the feature map can be generated by convolving the image with a kernel. The kernel can be selected by the CNN classification manager responsive to the class and/or sub-class identified by the CNN classification manager during the classification step. In some implementations, the CNN classification manager can generate a different feature map for each of the color channels contained in the image or can generate a single feature map for the image.

The method can also include scoring the feature maps (BLOCK 1010). Using a CNN, a weight in each of the classes and/or sub-classes can be generated. The highest weight classification can be used for the scoring of the features. The score can also be based on an extraction weight that can include extraction data that can be ranked by priority and on a field by field basis. After the processing is completed, the valid authenticators (passes) can be added up to generate a score.

The method can also include making an authenticity determination (BLOCK 1012). The score can be compared to a threshold at the account level to determine if the identification document is an authentic identification document. In some implementations, the CNN can use "required" authenticators. In these implementations, if the required authenticator fails, but other authenticators pass, the identification can still be marked as not authentic. In some implementations, the score can be compared to the scores of known authentic identification documents using artificial intelligence (e.g., machine learning or neural and semantic networks).

CONCLUSION

While the invention has been particularly shown and described with reference to specific embodiments, it should be understood by those skilled in the art that various changes in form and detail may be made therein without departing from the spirit and scope of the invention described in this disclosure.

While this specification contains many specific embodiment details, these should not be construed as limitations on the scope of any inventions or of what may be claimed, but rather as descriptions of features specific to particular embodiments of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Having described certain embodiments of the methods and systems, it will now become apparent to one of skill in the art that other embodiments incorporating the concepts of the invention may be used. It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

What is claimed is:

1. A method to determine whether physical identification documents are authentic, comprising:
   receiving, by an authentication manager, an image of a physical identification document to be authenticated;
   extracting, by the authentication manager, a set of characteristics of the physical identification document from the image;
   determining, by the authentication manager, a class of the physical identification document based on the set of characteristics of the physical identification document;
   applying, by the authentication manager and based on the class of the physical identification document, a convolution kernel to generate pixels of a feature map for a channel of the image by convolving the channel of the image with the convolution kernel;
   determining, by the authentication manager, a score based on pixels of the feature map; and
   providing, by the authentication manager, an indication that the physical identification document is authentic based on the score.

2. The method of claim 1, wherein the image of the physical identification document comprises a plurality of channels.

3. The method of claim 2, further comprising:
   applying, by the authentication manager and based on the class of the physical identification document, a respective convolution kernel to generate pixels of a respective feature map for each channel of the image by convolving the respective channel of the image with the respective convolution kernel; and
   determining, by the authentication manager, the score based on the respective feature map for each of the plurality of channels.

4. The method of claim 2, further comprising:
   generating, by the authentication manager, a respective feature map for each of the plurality of channels using the convolution kernel.

5. The method of claim 2, wherein each of the channels corresponds to a respective color.

6. The method of claim 1, further comprising:
   training a convolutional neural network with a first plurality of scores from previously authenticated physical identification documents and a second plurality of scores from previously invalidated physical identification documents; and
   determining the indication that the physical identification is authentic using the convolutional neural network.

7. The method of claim 1, further comprising:
   determining, by the authentication manager, a class of a first face of the physical identification document;
   determining, by the authentication manager, a class of a second face of the physical identification document; and
   determining, by the authentication manager, the score based on a comparison of the class of the first face of the physical identification document and the class of the second face of the physical identification document.

8. The method of claim 1, further comprising:
   normalizing, by the authentication manager, the image of the physical identification document.

9. The method of claim 8, wherein normalizing the image of the physical identification document comprises at least one of removing a background from the image, rotating the image, deskewing the image, removing a glare from the image, correcting an exposure of the image, or correcting a blur of the image.

10. The method of claim 1, further comprising:
    determining, by the authentication manager, a subclass of the physical identification document based on the set of characteristics of the physical identification document; and
    applying the convolution kernel based on both the class and the subclass of the physical identification document.

11. The method of claim 1, wherein the set of characteristics of the physical identification document comprises a physical size of a barcode, a location of a barcode, or a location of a security feature.

12. A system to determine whether physical identification documents are authentic, the system comprising an authentication manger executable by one or more processors to:
    receive an image of a physical identification document to be authenticated;
    extract a set of characteristics of the physical identification document from the image;
    determine a class of the physical identification document based on the set of characteristics of the physical identification document;
    apply, based on the class of the physical identification document, a convolution kernel to generate pixels of a feature map for a channel of the image by convolving the channel of the image with the convolution kernel;
    determine a score based on pixels of the feature map; and
    provide an indication that the physical identification document is authentic based on the score.

13. The system of claim 12, wherein image of the physical identification document comprises a plurality of channels.

14. The system of claim 13, wherein the authentication manager is executable by the one or more processors to:
    apply, based on the class of the physical identification document, a respective convolution kernel to generate pixels of a respective feature map for a respective channel of the image by convolving the respective channel of the image with the respective convolution kernel; and
    determine the score based on the respective feature map for each of the plurality of channels.

15. The system of claim 13, wherein the authentication manager is executable by the one or more processors to generate a respective feature map for each of the plurality of channels using the convolution kernel.

16. The system of claim 12, wherein the authentication manager is executable by the one or more processors to:
    train a convolutional neural network with a first plurality of scores from previously authenticated physical identification documents and a second plurality of scores from previously invalidated physical identification documents; and
    determine the indication that the physical identification is authentic using the convolutional neural network.

17. The system of claim 12, wherein the authentication manager is executable by the one or more processors to:
    determine a class of a first face of the physical identification document;
    determine a class of a second face of the physical identification document; and
    determine the score based on a comparison of the class of the first face of the physical identification document and the class of the second face of the physical identification document.

18. The system of claim 12, wherein the authentication manager is executable by the one or more processors to normalize the image of the physical identification document.

19. The system of claim 18, wherein normalizing the image of the physical identification document comprises at least one of removing a background from the image, rotating the image, deskewing the image, removing a glare from the image, correcting an exposure of the image, or correcting a blur of the image.

20. The system of claim 12, wherein the authentication manager is executable by the one or more processors to:
- determine a subclass of the physical identification document based on the set of characteristics of the physical identification document; and
- apply the convolution kernel based on both the class and the subclass of the physical identification document.

\* \* \* \* \*

UNITED STATES PATENT AND TRADEMARK OFFICE
CERTIFICATE OF CORRECTION

PATENT NO. : 10,410,309 B2
APPLICATION NO. : 16/286470
DATED : September 10, 2019
INVENTOR(S) : Rodriguez et al.

Page 1 of 1

It is certified that error appears in the above-identified patent and that said Letters Patent is hereby corrected as shown below:

In the Claims

Claim 12, Column 26, Line 15, please delete "manger executable by" and insert --manager executable by--;

Claim 16, Column 26, Line 53, please delete "identification is" and insert --identification document is--.

Signed and Sealed this
Twenty-fourth Day of December, 2019

Andrei Iancu
*Director of the United States Patent and Trademark Office*